US005568956A

United States Patent [19]

Benefield

[11] Patent Number: 5,568,956
[45] Date of Patent: Oct. 29, 1996

[54] TRUCK HUB CARRIER

[76] Inventor: Weldon Benefield, 1561 Sandlewood Dr., El Centro, Calif. 92243

[21] Appl. No.: 373,753

[22] Filed: Jan. 17, 1995

[51] Int. Cl.$^6$ ............................ B25B 27/14; B65G 7/12
[52] U.S. Cl. ........................ 294/15; 29/273; 294/92
[58] Field of Search ................................ 294/15, 16, 90, 294/92; 29/270, 273, 278, 283, 802; 81/15.2; 157/1.11, 14; 254/131, 133 R

[56] References Cited

U.S. PATENT DOCUMENTS

| 877,012 | 1/1908 | Sullivan | 294/16 |
|---|---|---|---|
| 1,920,350 | 8/1933 | Bourdon | 29/273 X |
| 2,842,390 | 7/1958 | Stine | 294/15 |
| 4,602,415 | 7/1986 | Garcia | 29/273 |

FOREIGN PATENT DOCUMENTS

| 603079 | 4/1926 | France | 294/15 |
|---|---|---|---|
| 627391 | 10/1927 | France | 29/273 |
| 33417 | 9/1928 | France | 29/273 |
| 681492 | 5/1930 | France | 29/273 |
| 686360 | 7/1930 | France | 29/273 |
| 702461 | 4/1931 | France | 29/273 |

*Primary Examiner*—Johnny D. Cherry
*Attorney, Agent, or Firm*—Ralph S. Branscomb

[57] ABSTRACT

A carrier for a large truck wheel hub and drum combination defines a pair of spaced sleeves which engage two of the ten wheel-mounting lugs extending from the hub, enabling it to be carried with ease by two men. The metal sleeves are fixed to a pair of hinged legs which together define a collapsible V-shaped spanner bar, spanning across the front face of the wheel hub. A pair of collapsible gripping bars extend forwardly from the legs alongside the hub, providing handgrips, permitting the hub to be evenly balanced on the carrier between two men, who can very easily maneuver the wheel hub back onto, or off of, a truck axle mount, a job which currently is one to dread. In a variation that enables one man to do the job unassisted, the V-shaped spanner bar is replaced with a straight length that spans only two lugs and is connected to a gooseneck, engageable by a cherry picker. With the weight relieved by the cherry picker, the man can maneuver the hub without a helper.

7 Claims, 2 Drawing Sheets

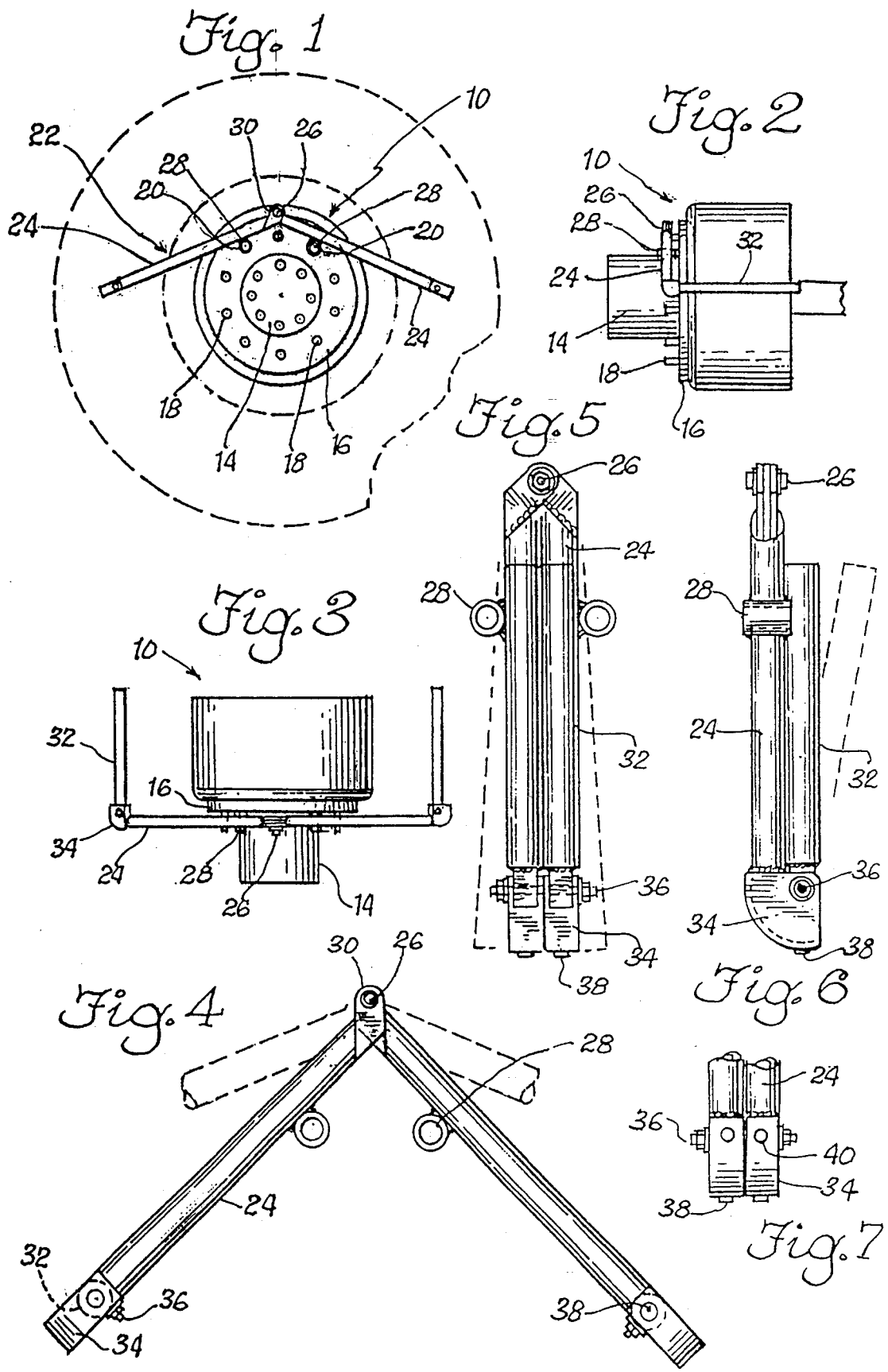

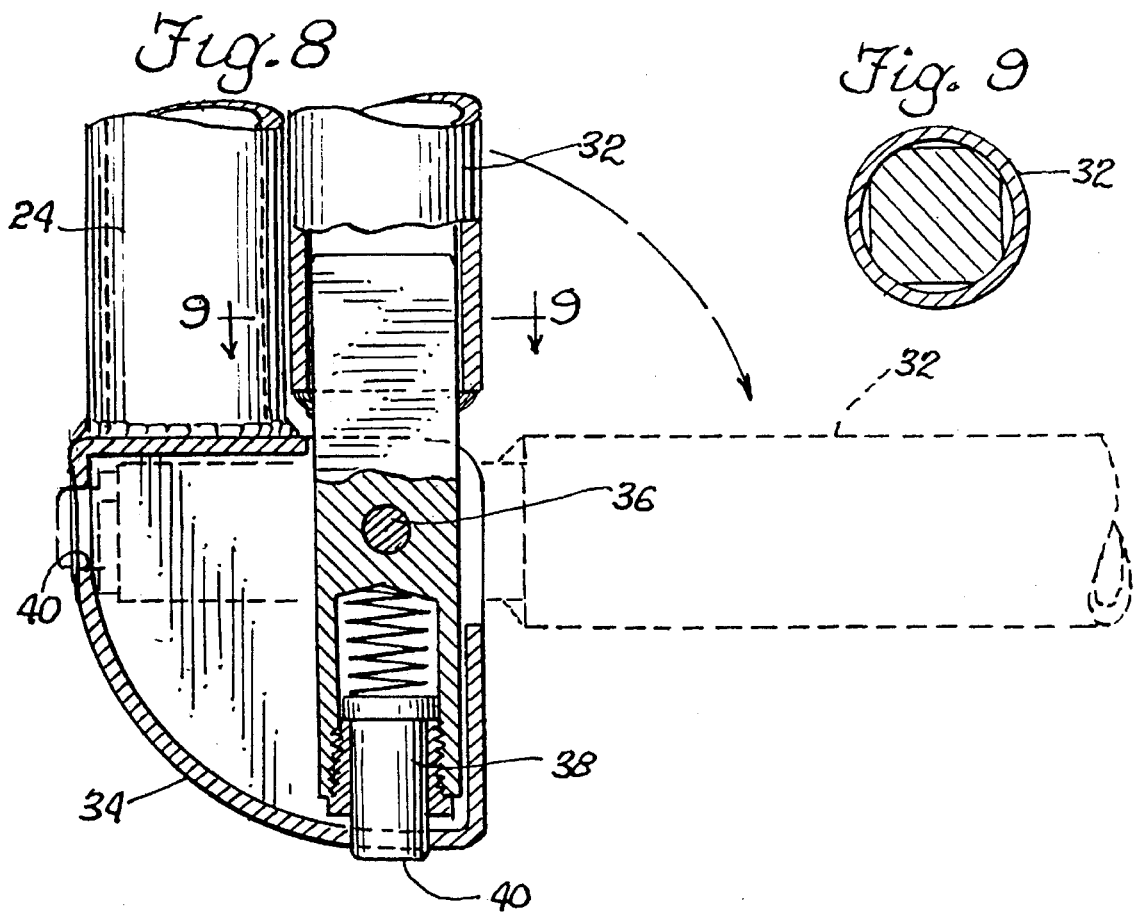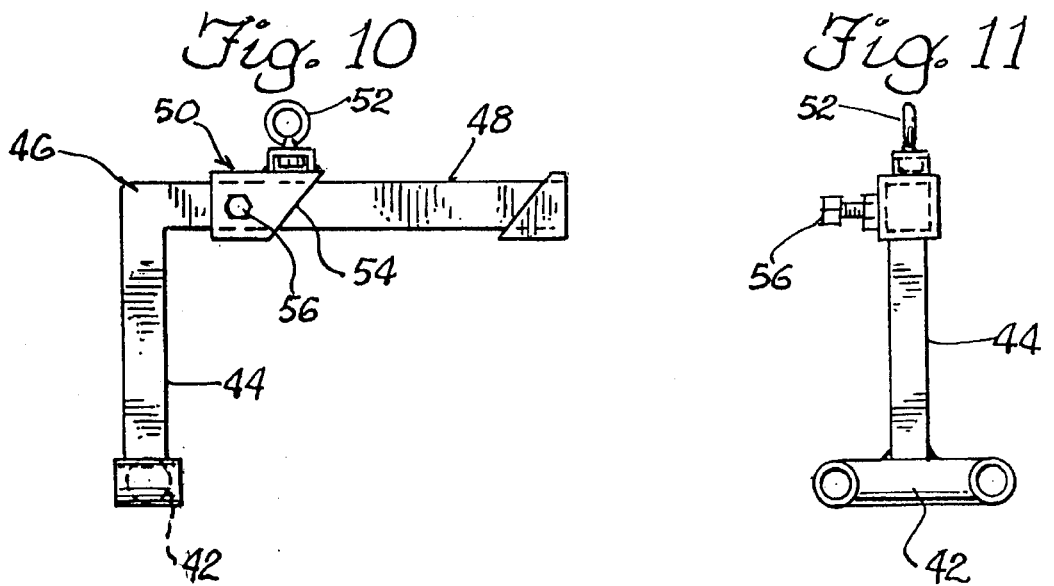

TRUCK HUB CARRIER

BACKGROUND OF THE INVENTION

Eighteen wheelers, and smaller trucks as well such as milk trucks and armored cars, almost universally use a standard ten-lug wheel configuration. The hubs of these wheels must be removed every time the brakes are accessed for service. The hub mounts to the axle, with the brake drum being bolted to the inside of the hub and extending up over the brake shoes. The hub and drum must bear the weight of the truck as well as the braking force exerted on the drums by the shoes. This structure has to be very strong and is quite heavy. The weight of the hub, coupled with the weight and awkward bell shape of the drum, makes it difficult for service people to remove the drum for servicing the brake.

Currently, a wheel dolly can be used to remove the dual wheels, hub and drum as a single unit. If no wheel dolly is available, a fork lift or pallet jack can be used in the same way. Removal using these lifting devices works very well, and when replacing bearings or seals, jobs not requiring separation of the hubs from the wheels, the same equipment can be used to remount the wheels, hub and drum as a single unit, with no problem.

However, when replacing wheel studs or servicing the brake drum, the wheels have to be removed from the hub. Once removed, it is very difficult to re-assemble the components when the hub is not mounted on the truck because of the bulk and weight of the wheels as well as the other parts. Therefore, the wheel dolly is useless. The hub and drum must be mounted first, and the wheel dolly is not designed for that. Manually mounting the hub and drum involves considerable effort and some risk of injury. In addition to the weight, there are no adequate handhold positions on the drum, and the location of the center of gravity is a foot or more away from the person(s) trying to mount the assembly.

When trying to lift the hub/drum at an awkward angle with a displaced center of gravity, it is quite heavy. But the actual weight is not so great that two people could not carry it easily with a proper horizontal spanner bar which eliminates all but gravitational forces on the load, eliminating the need to exert muscular force at awkward and ineffective angles just to maintain the orientation of the load. A carrier using this "pole principle" of native bearers can be used to facilitate handling these large hubs, converting a difficult and dangerous job to a simple one with little risk of injury.

The pole principle works with two men, but one man cannot hold both ends of the pole. It would be convenient at times to be able to connect and suspend the hub from a "Cherry Picker," the mobile frame that is used to move engines from engine compartments, so that a man working alone could maneuver it. The pole concept is adapted to cherry pickers inasmuch as the suspension and lifting force comes from the top. Virtually every shop has a cherry picker, which is useful in doing such a variety of chores around the shop that its utility far outweighs its storage burden.

SUMMARY OF THE INVENTION

The carrier disclosed herein transforms a job from one which is justifiably dreaded to one which is easy. The manually operated carrier version is rack-like in its deployed state, having a collapsible spanner bar with a central hinge and gripper bars that are horizontally extended from the lower ends of the spanner bar. Two people on opposite sides of the hub can lift their respective handles at that place along the handle which most closely balances the hub. Once balanced, the hub is not difficult to move.

The sleeves mounted to the spanner bar to engage the studs of the hub need not have any positive attachment at all, since once the studs are inserted into the sleeve and the gravitational torque is exerted against the spanner bar, a strong frictional connection is made which will hold until un-weighting occurs at the other end of the transport. For convenience in storage and portability, the carrier is comprised of four segments hinged together, the two spanner bar legs, and the horizontally extended carrying handles. All four collapse into a neat, compact block which renders it considerably easier to store.

The other, one-man embodiment of the invention is adapted to suspend the hub from a cherry picker. It has a gooseneck on top that mounts a horizontally adjustable swivel eyelet engageable by the cherry picker, which slides on a manually engageable gripping bar which is used to steer the hub as it is ferried to and from the truck mount.

Either embodiment makes moving the hub much easier than the brute force techniques that currently are used. The carrier in one or both embodiments is all one would ever need for this job, as it provides the easiest, simplest and safest way yet to remove and remount the hub and drum from/to the truck.

BRIEF DESCRIPTIONS OF THE DRAWINGS

FIG. 1 is an elevation view of a hub illustrating a wheel in phantom, referencing the manner of attachment of the carrier;

FIG. 2 is a slight elevation view of a typical hub;

FIG. 3 is a top plan view of the hub of FIG. 2 providing a better prospective on the forwardly-projecting handles of the carrier;

FIG. 4 is a front elevation view of the carrier illustrating the sleeves and the angle of attack used for the engagement of the hub studs;

FIG. 5 is a front elevation view, substantially identical to that of FIG. 4 but with the legs of the spanner bar in the collapsed mode;

FIG. 6 is a side elevation view of the collapsed apparatus of FIG. 5 as seen from the left side;

FIG. 7 is a detail of the handle joints of the invention as seen from the right side of FIG. 6;

FIG. 8 is partially sectioned view of a detail of the positive lock joint connecting each handle to the spanner bar;

FIG. 9 is a section taken along line 9—9 of FIG. 8;

FIG. 10 is a side elevation view of a modification of the invention in which the hub is carried by a cherry picker; and, FIG. 11 is an elevation view of the cherry picker modification as seen from the fight side of FIG. 10.

DETAILED DESCRIPTION OF THE PREFERRED EMBODIMENT

The carrier is shown on a hub with a wheel in the background in FIG. 1 for proper proportion, but would not ordinarily be used on a hub with a wheel on it. In its simplest form, which was the way the carrier was first conceived and used, it is a straight bar with a pair of sleeves on the bottom to engage studs of the hub. The improved version that is described is so superior to the single-piece unit that it is not shown.

The object of the invention is to provide for the easy moving of the brake drum 10, which is generally bowl-shaped to extend over the brake shoes, and the hub 14, to the inside of which the drum is mounted. These two pieces are together referred to as the "hub" at times below, unless the context indicates otherwise. The hub 14 is bolted to the truck axle and defines a central area 16 for mounting the wheels, which are retained on the hub on ten spaced lugs 18. The wheel is no longer on the studs when the carrier is used.

The hub is so large and unwieldy, and provides so little in the way of gripping surfaces, that it is dangerous to move. Coming immediately off of the truck, it is end-heavy and will tend to roll onto the person releasing it. It extends away from the serviceman, and it is awkward to reach, and is overbalanced with the center of gravity being spaced a considerable distance from the operator. The first described embodiment of the carrier is showing in use in FIG. 1. The spanner bar 22, which is a single piece in the simplest version of the invention, is now comprised of two legs 24 which are hinged together at 26 so that they will collapse together completely as shown in FIG. 5 from the fully expanded position of FIG. 4. The joint or hinge 26 limits the expansion of the two legs to about 90 degrees, but this is not critical to its use as the sleeves 28, when engaged on two of the lugs 20, stop the angular expansion of the two legs prior to their reaching full extent anyway. Because the lugs stop the expansion there is no strain on the joint, which could be tremendous due to the weight of the hub or the expansion to stop before the weight of the hub was fully vested.

Substantially all of the carrier is steel, and connections are made by welding where welding is possible and bolts when a hinged axis is needed. The sleeves 28 are securely welded at the appropriate points at the underside of the legs of the spanner bar. The sleeves are on the order of an inch and a half long as can be seen in FIG. 2. Their internal diameter is slightly greater than the outer diameter of the lugs, so when inserted over the lugs, the frictional engagement is quite great once the tilting force effected by gravity is applied by the sleeve and the lug. No other retainer is needed. In use, the sleeves slip effortlessly over the lugs when engaging, and once in the carrying mode, the two are coupled so securely that there is no possibility of accidental disengagement under any circumstances which could be characterized as normal.

The hinge 26 at the upwardly direct apex 30 of the carrier is a simple elbow joint. At the other ends of the legs 24 where the grip bars 32 connect, the joints are more complex. A detail of this joint, only slightly larger than scale, is shown in FIG. 8, partially in section. The grip extensions 32 fit into the quarter-circle end caps 34 which are welded integrally with the lower ends of the legs 24. Each grip bar is pivoted on a strong pin 36 which passes through all of the structure and defines the pivotal axis as well as capturing all the members along the axis of the pin, which transforms into a bolt and threaded tip externally of the joint. The end of the grip bar which inserts into the quarter turn end cap 34 seats a spring-loaded plunger detent 38 which alternatively snaps into spaced apertures 40 to define two positively engaged modes of use. This is a very strong joint, and in addition, is very convenient in that it will cleanly snap in and out of its useful mode, making it difficult to unknowingly use it when it is only halfway engaged.

A strong joint is needed because as shown in FIG. 3, it is essential to the proper and convenient functioning of the carrier that the carrier grip bars extend along side the hub, to be gripped close to the distal ends rather than the pivoted ends. This provides the dead weight of the hub with a considerable leverage arm to use in applying its torsional gravitationally induced force to the sleeves and joint structure of the carrier. The joints as shown, however, are more than adequate to handle the load, and the handle bars can extend as far forward as needed to provide hand space for the carrier at locations guaranteed to provide adequate alignment with the center of gravity of the hub to eliminate the great difficulty previously encountered in trying to move a mass so heavy and so imbalanced.

As shown in FIGS. 5 and 6, the arrangement of the two pivots, actually three hinged joints, is such that the two at the lower end of the legs are located at 90 degrees relative to the apex hinge joint so that a compact collapsed configuration as shown in FIG. 5 and 6 is possible. The collapsed mode is so compact that almost anyone can get their hand and fingers around enough of it to carry it as though they were carrying a baseball bat. As mentioned above, all joints are welded except those which must be pivotal. The steel nut-and-bolt / welding construction is virtually indestructible in ordinary use.

A variation of the theme is illustrated in FIGS. 10 and 11, in which the spanner bar is limited to a short span 42. This span will engage two adjacent lugs rather than lugs spaced apart by one lug. A gooseneck 44 reaches up from the spanner bar and defines an orthogonal bend at 46 so that the upper leg 48 is substantially horizontal, and suitable to seat a sliding connecter 50 comprised of a swivel-mounted eyelet 52 mounted on a sliding sleeve 54 which is selectably detained at any point along the upper leg of the gooseneck by means of a set screw 56.

There are two salient features of the embodiment of FIGS. 10 and 11. First, the slidingly adjustable eyelet feature enables the cherry picker, which supports the carrier in use, to position its center of lift relative to the hub such that the center of lift and the center of gravity substantially align, meaning that there is very little instability in the system in this orientation. The second feature is the horizontal leg, which doubles as a mount for the slider and as a hand grip for the worker so while the cherry picker supports the weight of the hub, the worker can maneuver easily by the ample length of the exposed handle, which would be at least five and more likely about eight inches in extent.

Although simple in initial concept, the invention has been worked from a simple bar with a pair of sleeves to a sophisticated collapsible, compact storage modern unit that is virtually certain to sell to a great many truck stop operations and mechanic shops which have been plagued with the chore of removing and reinstalling hubs from time untold.

I claim:

1. A truck hub carrier for a truck wheel hub defining an axis and having an annular mounting plate orthogonal to the wheel axis for mounting to an axle spindle and defining orthogonally outwardly-directed studs parallel to said axis for mounting a truck wheel thereon, and an inwardly-directed cowling which extends over a truck brake shoe from the periphery of said annular plate and causes said wheel hub to be eccentrically weighted with a center of gravity inwardly displaced from said annular plate, rendering said hub awkward to handle, said carrier comprising:

(a) a spanner bar extending substantially perpendicularly to said axis and laterally outwardly beyond said hub when in use;

(b) two parallel sleeves substantially parallel to said studs in use, and mounted on said bar at spaced locations thereon to permit same to slip over two studs of a wheel hub; and, (c) handle means attached to the ends of said spanner bar and extending parallel to said studs in the inward direction overlapping said hub to extend beyond the center of gravity of said hub such that said carrier can be engaged on two studs of a wheel hub by said sleeves and said handle means lifted to elevate and carry said wheel hub substantially in alignment with the center of gravity thereof, to and from an installation on a truck wheel axle and brake assembly.

2. A truck hub carrier according to claim 1 where said spanner bar is centrally angled to define two connected legs and said sleeves are mounted on the respective legs such that the sleeves will engage over two lugs of a standard truck hub while the two legs of said angled spanner bar strike a mutual angle on the order of 90 degrees, with the apex upwardly directed.

3. A truck hub carrier according to claim 1 wherein said spanner bar is provided as two hinged legs defining a connecting hinge with a hinge axis, and said sleeves are mounted on said respective legs on opposite sides of said hinge axis substantially equidistantly, and said handle means comprises a pair of parallel grip bars extending from the ends of said spanner bar in a direction substantially parallel to the hinge axis of said connecting hinge and orthogonal to the plane defined by said legs and said engagement structure comprises hand-grippable regions on said grip bars such that two persons can each take one of said grip bars and straddle a hub engaged on carrier and lift same without assistance from mobile equipment.

4. A truck hub carrier according to claim 3 wherein the two legs collapse around said hinge axis into a substantially linear configuration.

5. A truck hub carrier according to claim 4 wherein said grip bars are pivotally attached to the ends of said legs and collapse against same when not in use to define a substantially linear pack configuration including both legs and both grip bars.

6. A truck hub carrier according to claim 5 wherein said grip bars each connect to the respective leg at an elbow joint and said elbow joint defines two locking positions substantially 90-degrees removed from one another for locking same alternatively in said linear pack configuration, and deployed for use.

7. A truck hub carrier according to claim 6 wherein said locking positions are defined by a spring-loaded plunger engageable with either of two apertures in said elbow joint for a positive detent engagement.

* * * * *